United States Patent [19]

Self

[11] Patent Number: 4,822,003

[45] Date of Patent: Apr. 18, 1989

[54] VALVE FOR FIRE EXTINGUISHER

[76] Inventor: Freddy Self, 933 Parkside Dr., Richmond, Calif. 94803

[21] Appl. No.: 56,421

[22] Filed: Jun. 1, 1987

[51] Int. Cl.[4] ...................... A62C 13/24; A62C 23/00; A62C 39/00; F16K 25/00

[52] U.S. Cl. ...................................... 251/332; 169/76; 169/30; 169/89; 251/333

[58] Field of Search ....................... 169/30, 89, 71-77; 251/333, 334; 222/635, 630, 501, 510, 518, 559, 402.24, 402.25

[56] References Cited

U.S. PATENT DOCUMENTS

| | | | |
|---|---|---|---|
| Re. 31,417 | 10/1983 | Huber | 251/333 X |
| 224,133 | 2/1880 | Brazier | 251/333 |
| 933,863 | 9/1909 | Thompson | 251/333 |
| 2,185,438 | 1/1940 | Smirra | 251/334 |
| 2,471,460 | 5/1949 | Stroop | 169/74 |
| 3,229,851 | 1/1966 | Horwitt et al. | 169/75 X |
| 3,248,021 | 4/1966 | Corsette et al. | 251/333 X |
| 3,698,427 | 10/1972 | Baranowski, Jr. | 251/333 X |
| 3,741,310 | 6/1973 | Hansen | 169/89 |

FOREIGN PATENT DOCUMENTS

| | | | |
|---|---|---|---|
| 2505970 | 11/1982 | France | 169/30 |
| 1209 | of 1879 | United Kingdom | 251/333 |
| 1284877 | 8/1972 | United Kingdom | 169/77 |

*Primary Examiner*—Joseph F. Peters, Jr.
*Assistant Examiner*—James M. Kannofsky
*Attorney, Agent, or Firm*—Bielen & Peterson

[57] ABSTRACT

A valve, particularly useful in a fire extinguisher, which utilizes a stem movable in a passageway having a head connected to the stem. The head includes a relatively hard member possessing a hard outer surface which fits snugly within the passageway. The head further includes a deformable portion adjacent the relatively hard surface of the relatively hard member. The relatively hard surface of the relatively hard portion contacts and scrapes the wall portion prior to sealing which is effected between the deformable portion and the wall of the passageway.

2 Claims, 3 Drawing Sheets

VALVE FOR FIRE EXTINGUISHER

BACKGROUND OF THE INVENTION

The present invention relates to a novel and useful valve mechanism which is especially useful in a fire extinguisher.

Dry chemical fire extinguishers are usually employed to extinguish fires by pressing a lever on the exterior of the fire extinguisher. The lever, in turn, opens a valve in the interior of the fire extinguisher to release pressurized dry chemical material. Dry chemical agents such as sodium bicarbonate, possess a fineness which leaves a residual powder in the vicinity of the valve seat. Consequently, the valve is not capable of resealing without thorough cleaning of the valve seat. Where the fire extinguisher has been employed to extinguish a fire, cleaning the valve component is not normally a problem since the de-pressurized condition of the extinguisher is indicated by a gauge. However, in certain situations, many fire extinguishers are used minimally through tampering or by casual movement of the fire extinguisher lever. Although a very small amount of chemical may be expelled in this process, the dry chemical agent will foul the valve seat preventing closure of the valve. Eventually, pressure inside the extinguisher will slowly leak to inactive the fire extinguisher and render it useless in fighting a fire.

A fire extinguisher valve which is capable of reseating or resealing after expulsion of dry chemical agents would be an advance in the fire control field.

SUMMARY OF THE INVENTION

In accordance with the present invention a novel and useful valve which is particularly applicable to a fire extinguisher is provided.

The valve of the present application is employed in a passageway between the storage portion of a hand held fire extinguisher and the nozzle of the same. The valve possesses a stem which is movable within a passageway and is generally operated by an external lever.

The valve includes a head connected to the stem. Such head possesses a relatively hard portion having a hard outer surface. The outer surface of the relatively hard portion is capable of contacting and scraping the wall portion of the passageway. The head fits snugly within the passageway to achieve this purpose.

The head also includes a sealing portion which lies adjacent to the hard portion. The sealing portion may be constructed of deformable material. Sealing occurs between the wall portion of the passage way and the outer surface of the sealing portion of the head. Such sealing takes place after scraping of the wall of the passageway by the hard outer surface of the hard portion of the head. The sealing portion of the head may include a beveled outer surface to ameliorate such sealing.

In certain cases, the sealing or deformable portion of the head may be formed with a slot having an internal wall portion terminating a first and second edges at the mouth of the slot. The valve would also be defined to have a seat positioned at the terminus of the passageway. Such seat would include an edge portion which lies at the convergence of first and second wall portions thereof. The edge portion of the seat would be capable of entering the slot of the deformable portion of the head such that the first edge of the slot contacts and scrapes the edge portion of the seat with movement of the stem within the passageway. In this regard, the first edge of the slot is capable of contacting and scraping the first wall of the edge portion of the seat. Likewise, the relatively hard outer surface of the hard portion of the head is capable of contacting and scraping the second wall of the end portion of the seat during movement of the stem. Spring means may also provided for urging the seat edge into the slot of the deformable portion of the head.

It may be apparent that a novel and useful valve has been described.

It is therefore an object of the present invention to provide a valve which is especially useful in a fire extinguisher operable with dry chemical agents in powdered form.

It is another object of the present invention to provide a valve which is capable of resealing a fire extinguisher, employing dry chemical agents, which has been partially discharged.

Yet another object of the present invention is to provide a valve usable in a fire extinguisher which does not require servicing following tampering or casual use of the extinguisher.

A further object of the present invention is to provide a valve which is usable with powdered material which possesses a seat and seat-cleaning head portion.

The invention possesses other objects and advantages especially as concerns particular characteristics and features thereof which will become apparent as the specification continues.

Figure 1:
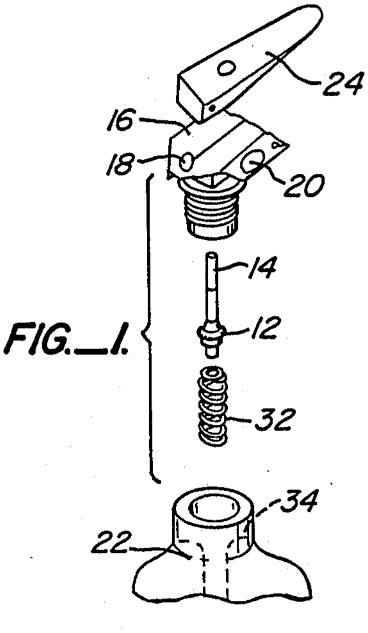
FIG. 1 is a top, front perspective exploded view of the valve of the present invention combined with an operating lever of a fire extinguisher.

For a better understanding of the invention reference is made to the following detailed description of the preferred embodiments thereof which should be referenced to the hereinabove described drawings.

DESCRIPTION OF THE PREFERRED EMBODIMENTS

The invention as a whole is depicted in the drawings by reference character 10. Each embodiment of the invention as a whole is followed by an upper case letter to distinguish the same. The valve 10, FIGS. 1–3D, includes as one of its elements a head 12 which is used in combination with a movable stem 14. Stem 14 connects to a manifold 16 having nozzle openings 18 and gauge opening 20. Normally, a gauge (not shown) would detect the internal pressure of the fire extinguisher in which valve 10 may be employed. Manifold 16 threadingly engages a container 22 for dry chemical agents such as sodium bicarbonate and the like. Lever 24 is connected to stem 14 and opens and closes valve 10 in normal operation. A passageway 26 communicates with the interior of container 22 and nozzle opening 18. When valve 10 is opened, dry chemical fire extinguisher agents pass from container 22 to nozzle opening 18 through passageway 26.

Figure 2:
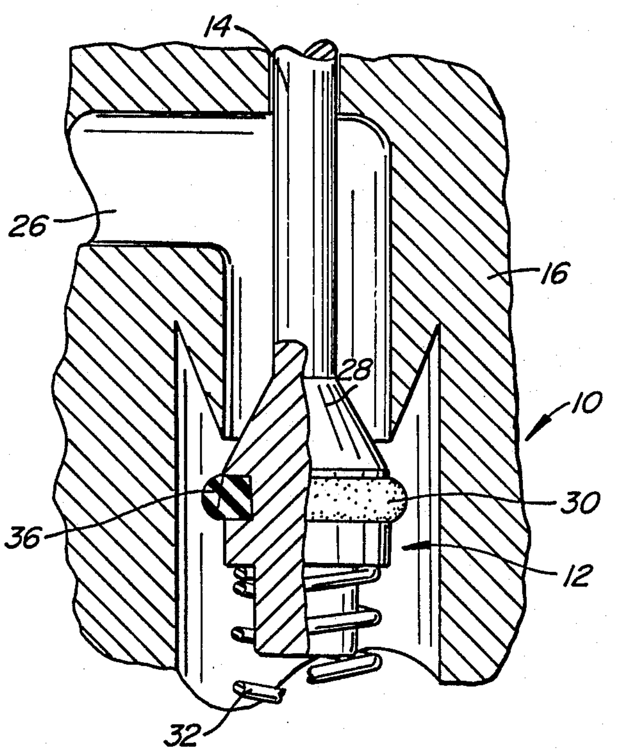
FIG. 2 is a sectional view of an embodiment of the valve of the present invention.

With reference to FIG. 2, head portion 12 of valve 10 is shown in detail. Head portion 12 includes a relatively hard portion 28 and a deformable or sealing portion 30. Spring means 32 urges head portion 12 toward lever 24. Spring means 32 gains purchase from shoulder 34 or internal components of container 22 such as siphon tube assemblies and the like (not shown).

Figure 3A:
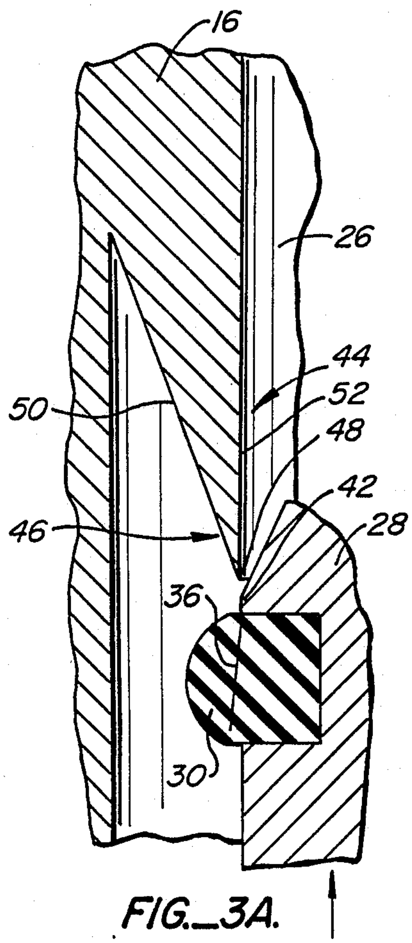
FIG. 3A is a sectional view of the head and seat portions of the embodiments of the valve of the present invention depicted in FIG. 2.
Figure 3B:
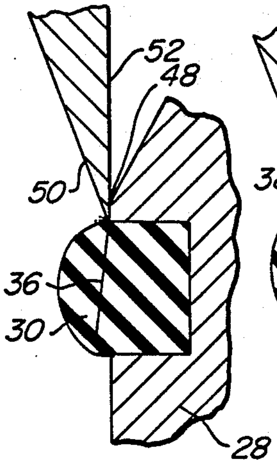
FIGS. 3B–3D represents the operation of the seating mechanism of the embodiment of the valve shown in FIGS. 2 and 3.
Figure 3C:
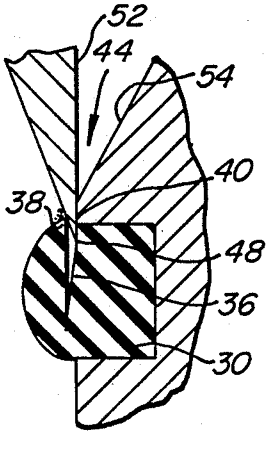
Figure 3D:
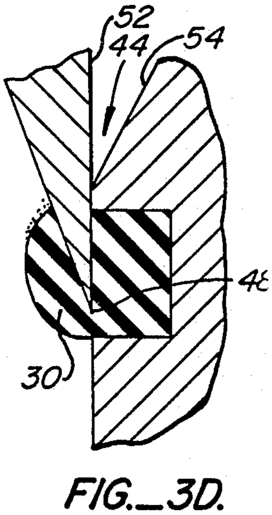

With reference to FIG. 3A it may be observed that deformable portion 30 includes a slot 36 having edges 38 and 40 surrounding mouth 42 of slot 36. Manifold 16 provides a seat 44 which is positioned within passageway 26. Seat 44 includes an edge portion 46 terminating in an edge 48 which is capable of entering slot 36 of deformable portion 30 of head 12. It should be noted that edge 48 of seat 44 is formed by the convergence of first wall 50 and second wall 52. Edge 38 of slot 36 is capable of contacting and scraping wall 50 of edge portion 46. Similarly, relatively hard portion 28 of head 12 includes a hard outer surface 54 which is capable of contacting and scrapping wall portion 52 of edge portion 46.

Figure 4A:
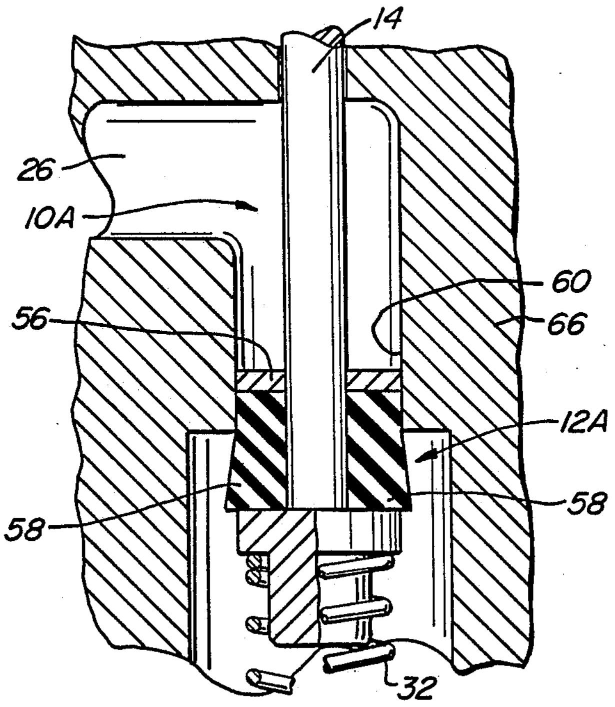
FIG. 4A is a sectional view of another embodiment of the valve of the present invention.
Figure 4B:
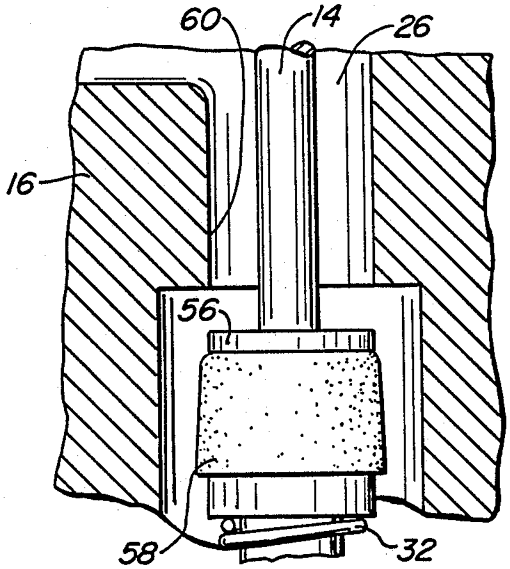
FIG. 4B is a another sectional view of the embodiment of the valve depicted in FIG. 4A with the valve head and stem shown in side elevation.

With reference to FIGS. 4A and 4B, another embodiment 10A of the present invention is illustrated. Head 12A of valve 10A includes a hard disk portion 56 which is connected to stem 14. In addition, a sealing portion 58 is also provided adjacent hard disk portion 56. Sealing portion 58 may be deformable and resilient, being constructed of material such as neoprene rubber. Wall portion 60 of passageway 26 serves as the seat for head 12A.

Figure 5:
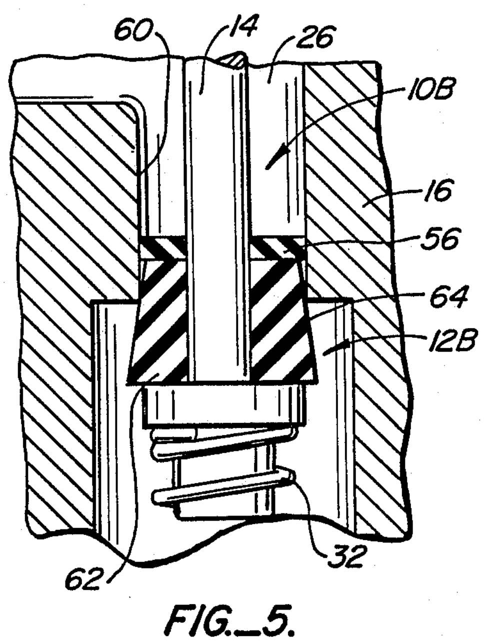
FIG. 5 is a sectional view of yet another embodiment of the valve of the present invention.

FIG. 5 depicts yet another embodiment of the present invention in which head 12B includes a sealing portion 62 of deformable and/or resilient material. Sealing portion 62 includes a sloping or beveled outer surface 64 which seals against wall portion 60 of passageway 26.

Figure 6:
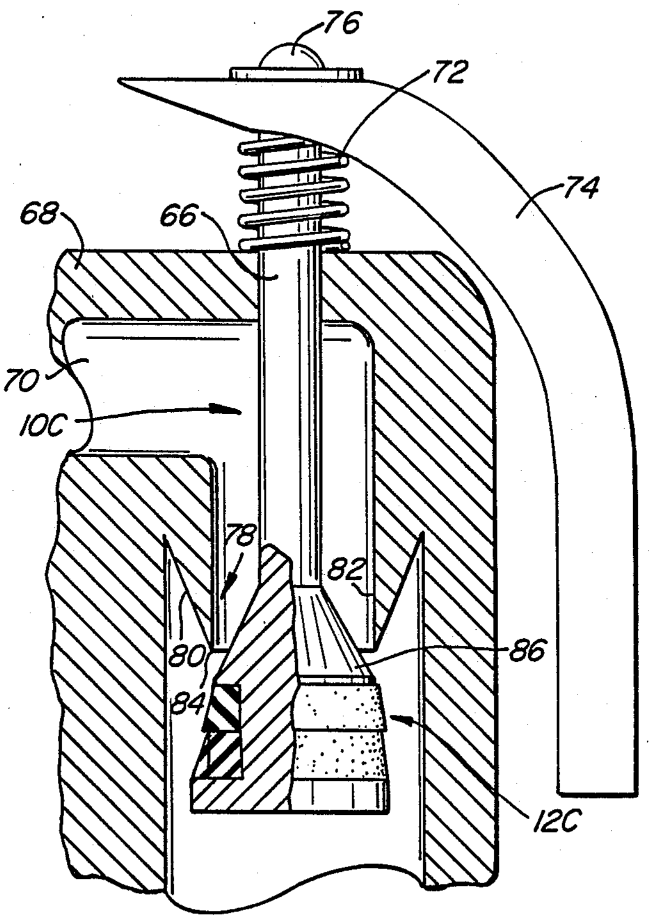
FIG. 6 is a sectional view of yet still another embodiment of the valve of the present invention.

FIG. 6 depicts yet another embodiment 10C of the present invention, which employs a stem 66 which fits within manifold 68 having passageway 70. Manifold 68 would again be used in conjunction with container 22. Spring means 72 rides against a lever 74 which is held to stem 66 by fastening means 76. Seat 78, similar to seat 44, possesses wall portions 80 and 82 which terminate in an edge 84. Head 12C includes a relatively hard portion 86 having a hard outer surface 88. Head 12C also possess sealing portion 90 and deformable portion 92. Sealing portion 90 seals against wall 82 of seat 78. Hard outer surface 88 of hard portion 86 scrapes wall 82 prior to such sealing. Further, edge 84 of seat 78 enters slot 94 of deformable portion 92. Edge 96 of slot 94 scrapes wall portion 80 of seat 78 after edge 94 of seat 78 enters slot 94.

Figure 7A:
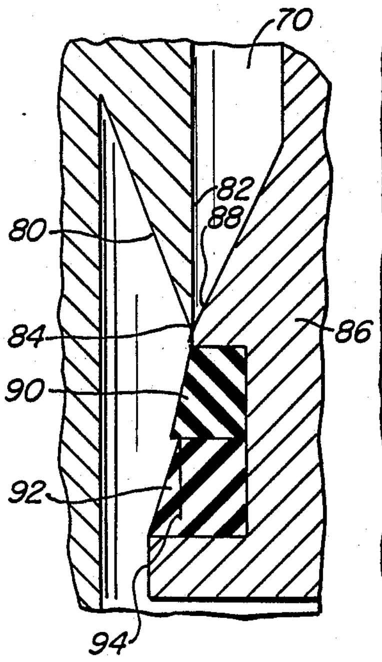
FIGS. 7A–7C is a sectional view of the seat and head portions of the embodiments of the valve of the present invention shown FIG. 6.
Figure 7B:
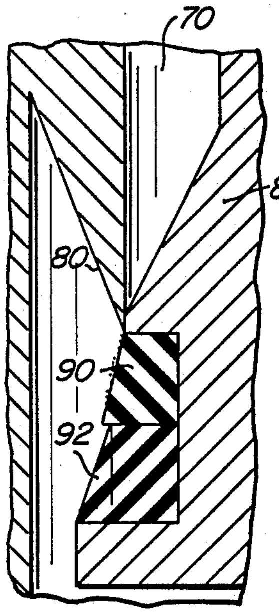
Figure 7C:
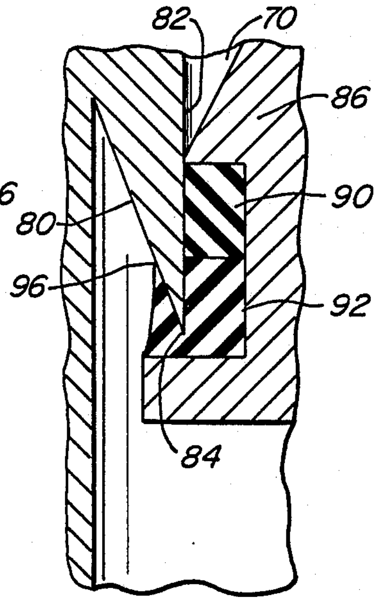

In operation, the user would cause stem 14, FIGS. 1–5, or stem 56 FIGS. 6–7C to move upwardly. This is usually accomplished by simply pressing lever 24 or lever 74 to activate spring means 32 or 72, respectively. In the case of embodiment 10, outer surface 54 of hard portion 28 of seat 12 would scrape wall 52 of seat 44, FIGS. 3B–3D. Wall 50 will be scraped by edge 38 of slot 36. Thus, seat 44 will seal within slot 36 cleaned of powdered fire extinguisher material.

Embodiment 10A will be sealed by the operation of disk 56 which scrapes wall 60 prior to sealing of wall 60 by sealing portion 58. Embodiment 10B operates similarly to embodiment 10A except the beveled outer surface 64 of sealing portion 62 seals against wall 60 after scraping and cleaning by disk 56. Embodiment 10C shows head 12C seating at seat 78, first by scraping of wall 82 by portion 86 and subsequently by sealing of sealing portion 90 and deformable portion 92 at seat 78. Edge portion 96 of slot 94 scrapes wall 40 when edge 84 of seat 78 enters slot 94 to produce second seal, in this regard. It should be noted, that portions 28, 56, and 86 of heads 12-12C are machined to close tolerance with passageways 26 and 70, as the case may be, to effect the scraping and contacting functions hereinbefore described. Thus, valves 10-10C preserve the pressure within container 22 even after fouling of respective seats by powdered fire extinguisher chemicals.

While in the foregoing embodiments of the present invention have been set forth in considerable detail for the purpose of making a complete disclosure of the invention it may be apparent to those of skill in numerous changes may be made in such details without departing from the spirit and principles of the invention.

What is claimed is:

1. A valve including a movable stem within a passageway comprising:

a. a head connected to said stem, said head including a relatively hard member having a hard outer surface fitting snugly within the passageway, said head further including a deformable portion adjacent said relatively hard surface of said relatively hard member, said deformable portion including a slot having an internal wall portion terminating in first and second edges at a mouth, said first and second edges of said slot lying against one another;

b. a seat, said seat positioned in the passageway, said seat including an edge portion formed by first and second converging walls, said seat edge portion having an edge capable of entering said slot of said deformable portion of said head and separating said first and second edges of said slot, said first edge of said slot being capable of contacting and scraping said edge portion of said seat with movement of the stem within the passageway during said separation of said first and second slot edges, said relatively hard outer surface of said hard portion of said head being capable of contacting and scraping said second wall of said seat, said first and second walls being scraped simultaneously by said first edge of said slot and said relatively hard outer surface of said hard portion of said head, respectively.

2. The valve of claim 1 which additionally comprises spring means for urging said seat edge into said slot of said deformable portion of said head.

* * * * *